United States Patent
Ikeda

(10) Patent No.: US 9,395,809 B2
(45) Date of Patent: Jul. 19, 2016

(54) INFORMATION PROCESSING APPARATUS AND CONTROL METHOD THEREOF

(71) Applicant: CANON KABUSHIKI KAISHA, Tokyo (JP)

(72) Inventor: Kaori Ikeda, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 14 days.

(21) Appl. No.: 14/178,691

(22) Filed: Feb. 12, 2014

(65) Prior Publication Data

US 2014/0241594 A1  Aug. 28, 2014

(30) Foreign Application Priority Data

Feb. 27, 2013  (JP) .................. 2013-037694

(51) Int. Cl.
  *G06K 9/00* (2006.01)
  *G06F 3/00* (2006.01)
  *G06F 21/32* (2013.01)
  *G06K 9/62* (2006.01)

(52) U.S. Cl.
  CPC ............... *G06F 3/005* (2013.01); *G06F 21/32* (2013.01); *G06K 9/00288* (2013.01); *G06K 9/6255* (2013.01)

(58) Field of Classification Search
  None
  See application file for complete search history.

(56) References Cited

U.S. PATENT DOCUMENTS

| | | | |
|---|---|---|---|
| 7,260,724 B1 * | 8/2007 | Dickinson et al. | 713/182 |
| 8,453,207 B1 * | 5/2013 | White et al. | 726/2 |
| 2002/0073213 A1 * | 6/2002 | Mekata et al. | 709/229 |
| 2004/0049687 A1 * | 3/2004 | Orsini et al. | 713/189 |
| 2007/0160198 A1 * | 7/2007 | Orsini et al. | 380/28 |
| 2007/0260888 A1 * | 11/2007 | Giobbi et al. | 713/186 |
| 2008/0232651 A1 * | 9/2008 | Woo | 382/118 |
| 2009/0180672 A1 * | 7/2009 | Ishiyama | 382/118 |
| 2010/0021020 A1 * | 1/2010 | Ueda | 382/118 |
| 2011/0038512 A1 * | 2/2011 | Petrou et al. | 382/118 |
| 2012/0072723 A1 * | 3/2012 | Orsini et al. | 713/165 |
| 2012/0163722 A1 * | 6/2012 | Boncyk et al. | 382/218 |
| 2012/0257797 A1 * | 10/2012 | Leyvand et al. | 382/118 |
| 2012/0294495 A1 * | 11/2012 | Wren et al. | 382/118 |
| 2013/0036461 A1 * | 2/2013 | Lowry | 726/19 |
| 2013/0136320 A1 * | 5/2013 | Nishiguchi et al. | 382/118 |
| 2014/0205157 A1 * | 7/2014 | Suzuki | 382/118 |

FOREIGN PATENT DOCUMENTS

JP  2010-073108 A  4/2010

* cited by examiner

Primary Examiner — Randolph I Chu
(74) Attorney, Agent, or Firm — Cowan, Liebowitz & Latman, P.C.

(57) ABSTRACT

An information processing apparatus which communicates with an external apparatus having a face authentication function, comprises a unit which acquires a type of the authentication function of the external apparatus from the external apparatus; a unit which receives image data held in the external apparatus and a face feature amount used by the external apparatus for the authentication function; and a unit which controls, in accordance with a result of comparing a type of a face authentication function of the information processing apparatus with the type of the authentication function of the external apparatus, whether to use the received face feature amount for the authentication function of the information processing apparatus, or to re-generate, from the received image data, a face feature amount corresponding to the type of the authentication function of the information processing apparatus.

13 Claims, 14 Drawing Sheets

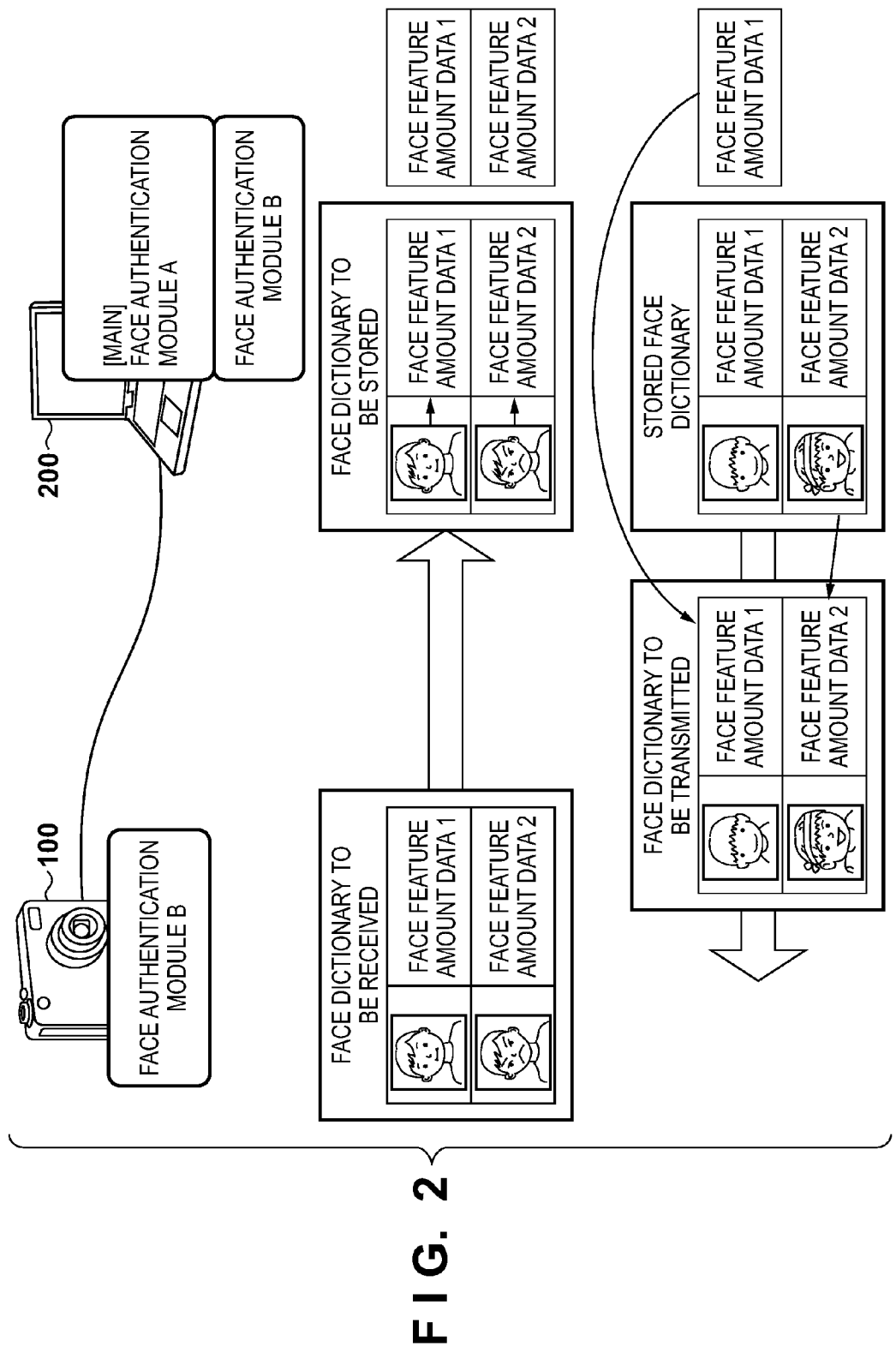
F I G. 2

| | | |
|---|---|---|
| FACE AUTHENTICATION MODULE ID | A | ~301 |
| PERSON'S NAME | SUZUKI | ~302 |
| AUTHENTICATION FACE SET 1 |  | FACE FEATURE AMOUNT DATA 1 |
| AUTHENTICATION FACE SET 2 |  | FACE FEATURE AMOUNT DATA 2 |
| AUTHENTICATION FACE SET 3 |  | FACE FEATURE AMOUNT DATA 3 |
| AUTHENTICATION FACE SET 4 |  | FACE FEATURE AMOUNT DATA 4 |
| AUTHENTICATION FACE SET 5 |  | FACE FEATURE AMOUNT DATA 5 |

303, 304

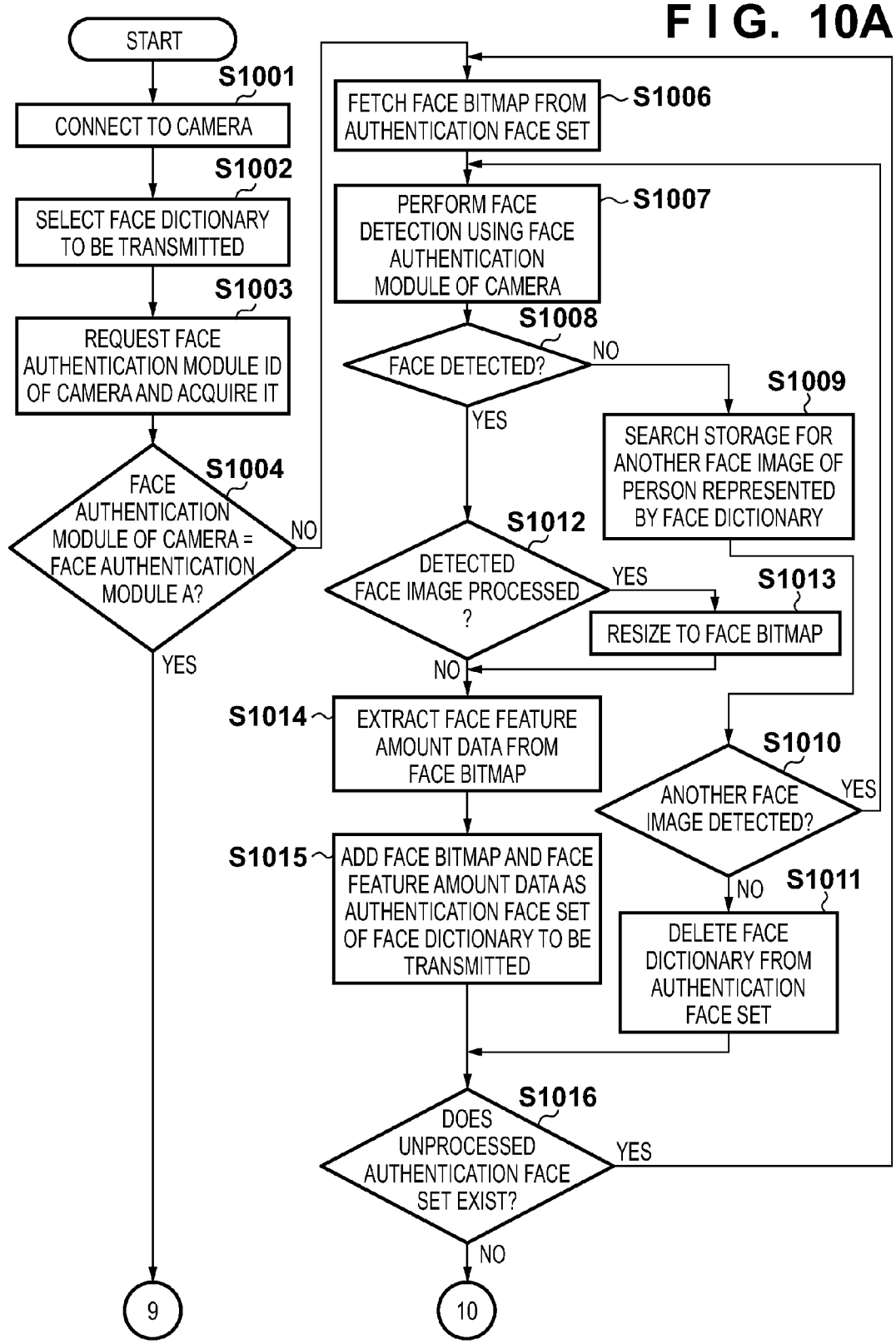
F I G. 10A

F I G. 10B
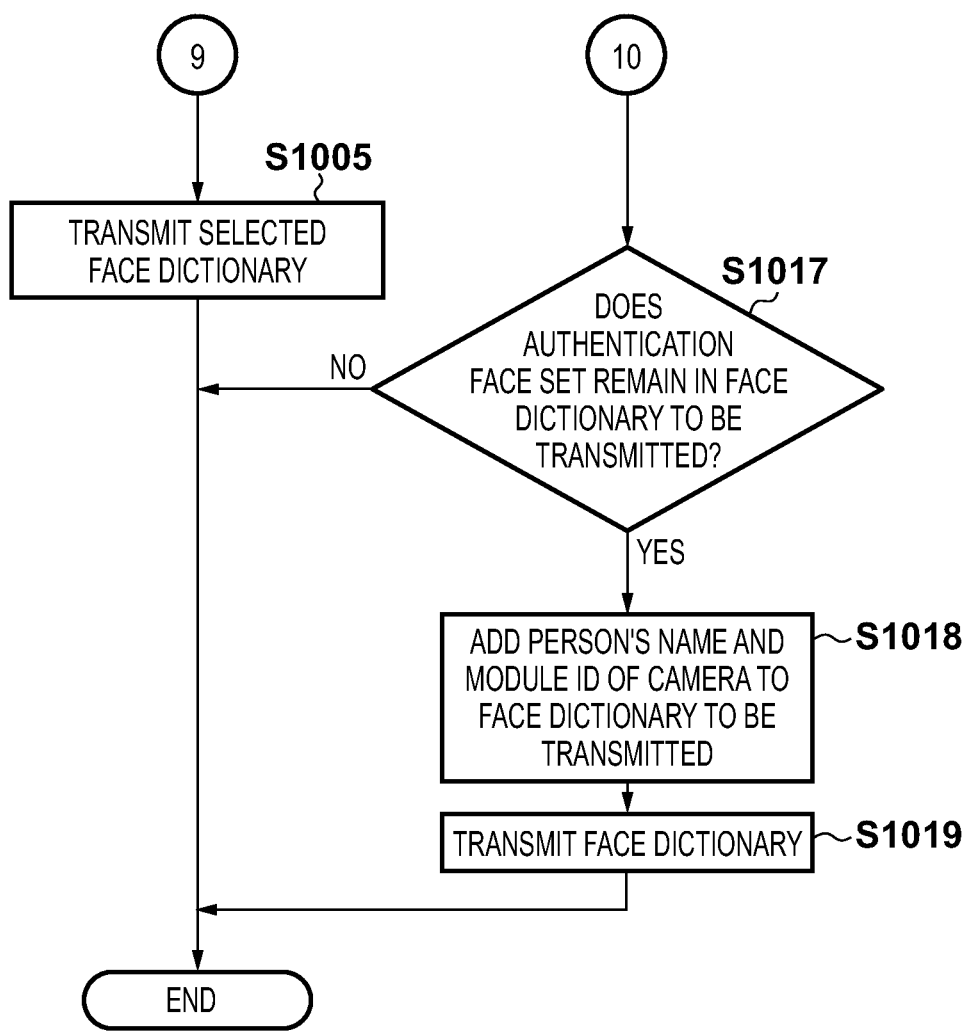

INFORMATION PROCESSING APPARATUS AND CONTROL METHOD THEREOF

BACKGROUND OF THE INVENTION

1. Field of the Invention

The present invention relates to an object authentication technique for authenticating an object in an image.

2. Description of the Related Art

Some recent image capturing apparatuses such as a digital camera have a function of authenticating a specific object, such as a face detection function or face authentication function. The face detection function is a function of recognizing the face region of a person in a captured image. The face detection function is applied to, for example, determination of whether objects include a person, and a function of automatically focusing a person. The face detection function is used as an auxiliary means for comfortable shooting by the user. The face authentication function is a function of identifying a person by a face authentication module by extracting feature amount data of a person's face detected by the face detection function and comparing the extracted feature amount data with feature amount data of a person registered in advance. The face authentication function is applied to, for example, arrange and search for image data after shooting.

As an application technique of these functions, for example, Japanese Patent Laid-Open No. 2010-073108 has disclosed a technique of exchanging a face dictionary between a plurality of apparatuses to share face feature amount data.

However, even when the face dictionary can be shared between apparatuses as in Japanese Patent Laid-Open No. 2010-073108, if the formats of face feature amount data used by the respective face authentication modules of the receiving and transmitting apparatuses are different, received data cannot be used for face authentication. Also, if the type of face authentication function, for example, the face authentication module differs between the receiving and transmitting apparatuses, face feature amount data corresponding to the different face authentication modules need to be re-generated.

SUMMARY OF THE INVENTION

The present invention has been made in consideration of the aforementioned problems, and realizes a technique capable of sharing face feature amount data even when the type of face authentication function is different between apparatuses.

In order to solve the aforementioned problems, the present invention provides an information processing apparatus which communicates with an external apparatus having a face authentication function, comprising: an acquisition unit configured to acquire a type of the face authentication function of the external apparatus from the external apparatus; a reception unit configured to receive image data held in the external apparatus and a face feature amount used by the external apparatus for the face authentication function; and a control unit configured to control, in accordance with a result of comparing a type of a face authentication function of the information processing apparatus with the type of the face authentication function of the external apparatus, whether to use the face feature amount received by the reception unit for the face authentication function of the information processing apparatus, or to re-generate, from the received image data, a face feature amount corresponding to the type of the face authentication function of the information processing apparatus.

In order to solve the aforementioned problems, the present invention provides a control method of an information processing apparatus which communicates with an external apparatus having a face authentication function, the method comprising the steps of: acquiring a type of the face authentication function of the external apparatus from the external apparatus; receiving image data held in the external apparatus and a face feature amount used for the face authentication function; and controlling, in accordance with a result of comparing a type of a face authentication function of the information processing apparatus with the type of the face authentication function of the external apparatus, whether to use the received face feature amount for the face authentication function of the information processing apparatus, or to re-generate, from the received image data, a face feature amount corresponding to the type of the face authentication function of the information processing apparatus.

According to the present invention, even when the type of face authentication function is different between apparatuses, face feature amount data can be shared.

Further features of the present invention will become apparent from the following description of exemplary embodiments (with reference to the attached drawings).

BRIEF DESCRIPTION OF THE DRAWINGS

FIG. 2 is a view for explaining a face dictionary exchange method between the image capturing apparatus and the information processing apparatus according to the embodiment;

FIGS. 10A-10B are flowcharts showing processing of transmitting a face dictionary from the information processing apparatus to the image capturing apparatus according to the second embodiment.

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

First Embodiment

An example in which an information processing apparatus according to the present invention is implemented by a personal computer (to be referred to as a PC hereinafter) will be described. However, the present invention is also applicable to an image capturing apparatus such as a digital camera which shoots moving images and still images, or a portable electronic device such as a smartphone.

The embodiment implements a system in which a face dictionary used for object authentication in an information processing apparatus (to be referred to as a PC hereinafter), in which the first face authentication module having the first face authentication function runs, is shared (synchronized) with a face dictionary used for object authentication in another apparatus (to be referred to as a camera hereinafter), in which the second face authentication module having the second face authentication function runs.

An image management application (to be referred to as a PC application hereinafter) installed in the PC executes processing based on a function according to the embodiment.

As a case in which the type of face authentication function differs between apparatuses, a case in which the PC application has the latest first face authentication module and face dictionary and the camera has the second face authentication module and face dictionary of an old version will be explained.

When sharing (synchronizing) images and a face dictionary with the camera, the PC application acquires, from a server or the camera, the second face authentication module used in the camera, and installs it in the PC. Then, the PC application analyzes images and a face dictionary received from the camera, and can generate a face dictionary corresponding to the second face authentication module of the camera.

In the PC application, the first face authentication module installed in the PC manages the images by using the face dictionary. The face dictionary used in the first face authentication module is updated using face images and the like loaded from the camera. To transmit the latest face dictionary to the camera and share (synchronize) it, the PC application converts the data format so that the second face authentication module of the camera can use the latest face dictionary, and then transmits the latest face dictionary to the camera.

<Camera Configuration> The configuration of a camera according to the embodiment will be explained with reference to FIG. 1A.

Figure 1A:
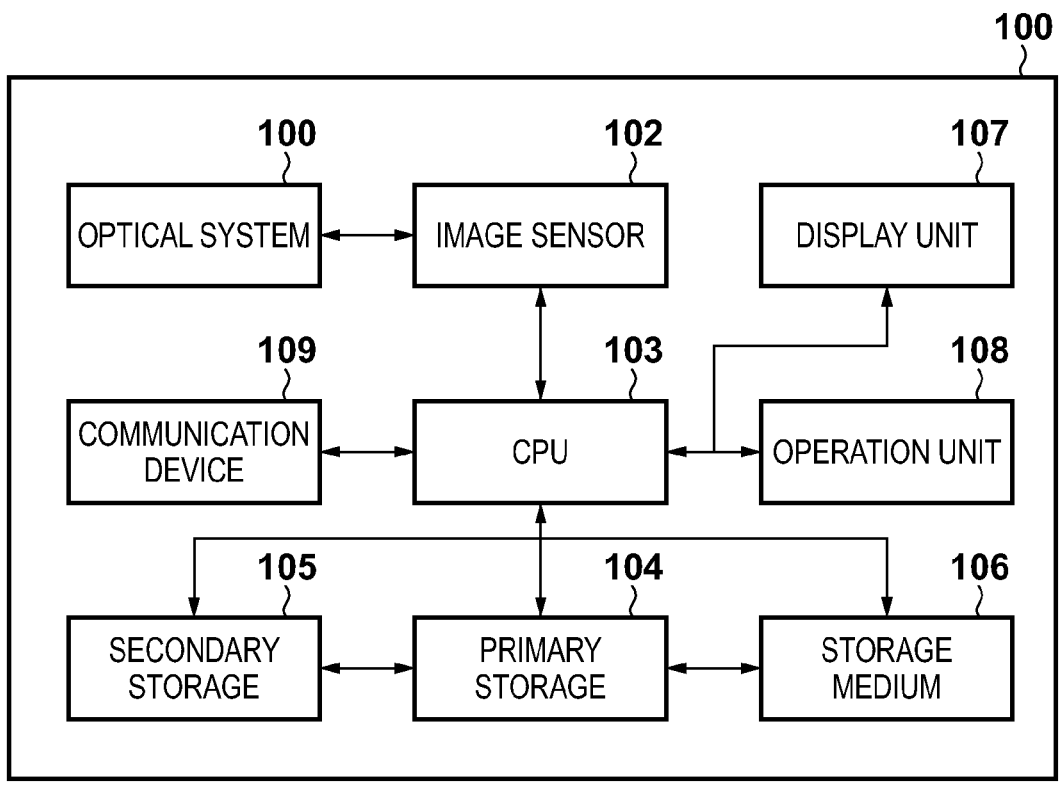
FIG. 1A is a block diagram showing the configuration of an image capturing apparatus according to an embodiment of the present invention.

Referring to FIG. 1A, a camera 100 includes an optical system 101, image sensor 102, CPU 103, primary storage 104, secondary storage 105, storage medium 106, display unit 107, operation unit 108, and communication device 109.

The optical system 101 includes a lens, shutter, and stop, and forms light traveling from an object into an image on the image sensor 102 at an appropriate amount and timing. The image sensor 102 converts, into an electrical signal, the light which has been formed into an image through the optical system 101. In accordance with an input signal or program, the CPU 103 performs various calculation operations and control of each unit which constitutes the camera 100. The primary storage 104 is a volatile memory or the like, stores temporary data, and is used for work by the CPU 103. The secondary storage 105 is a hard disk drive or the like, and stores programs (firmware) for controlling the camera 100, various kinds of setting information, and the like. The storage medium 106 stores captured image data, a face dictionary, and the like. Note that the storage medium 106 is detachable from the camera 100 and attachable in a PC 200 (to be described later) or the like to read out image data. That is, the camera 100 suffices to include an access means to the storage medium 106 and execute readout/write of data from/in the storage medium 106. The face dictionary is stored in the storage medium 106, but may be stored in the secondary storage 105. The display unit 107 displays a viewfinder image upon shooting, a shot image, a text for an intuitive operation, and the like. Registration of a face dictionary and display of the registered face dictionary are also performed on the display unit 107. The operation unit 108 accepts a user operation. The operation unit 108 can use, for example, a button, lever, and touch panel. The communication device 109 connects the camera 100 to an information processing apparatus such as a PC so that the camera 100 can communicate with it, and transmits/receives control commands and data. As a protocol for establishing a connection with the information processing apparatus and communicating data, for example, PTP (Picture Transfer Protocol) or MTP (Media Transfer Protocol) is used. Note that the communication device 109 may perform communication through wired connection using a USB (Universal Serial Bus) cable or the like. Alternatively, the communication device 109 may perform communication through wireless connection using a wireless LAN or the like. The communication device 109 may connect the camera 100 to the information processing apparatus directly, through a server, or via a network such as the Internet.

<PC Configuration> The configuration of the PC according to the embodiment will be explained with reference to FIG. 1B.

Figure 1B:
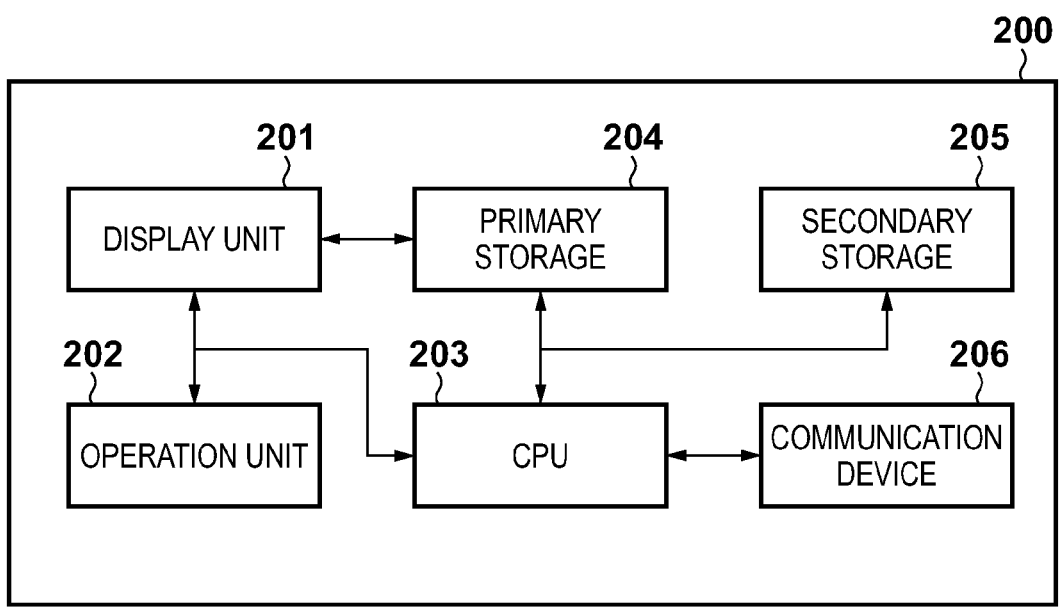
FIG. 1B is a block diagram showing the configuration of an information processing apparatus according to the embodiment of the present invention.

Referring to FIG. 1B, the PC 200 includes a display unit 201, operation unit 202, CPU 203, primary storage 204, secondary storage 205, and communication device 206. The basic functions of the respective components are the same as those of the camera 100, and a detailed description thereof will not be repeated. Note that a liquid crystal display panel (LCD) or the like is applied as the display unit 201. The PC 200 need not include the display unit 201, and suffices to have a display control function of controlling display on the display unit 201. As the operation unit 202, a keyboard, mouse, and the like are applied. For example, the user uses the operation unit 202 to select a face dictionary to be transmitted to the camera 100, or input a person's name when generating a face dictionary.

<Face Dictionary Exchange Method between PC and Camera> A face dictionary exchange method between the PC and the camera according to the embodiment will be explained with reference to FIG. 2.

The PC 200 includes a face authentication module A capable of face authentication, and another face authentication module B used in the camera 100. In this case, the data format of face feature amount data to be extracted differs between the face authentication modules A and B.

Note that the difference in the type of face authentication module may be a large difference between algorithms in the modules, or the difference between only the versions of the modules though the algorithms are not so different.

The PC 200 performs face detection using the face authentication module A, and extracts face feature amount data. The PC 200 identifies a person by comparing similarities each between face feature amount data obtained by analyzing a face extracted from each image by the face authentication module A, and face feature amount data registered in a face dictionary. The face authentication module B is used when the PC 200 is connected to the camera 100 having the face authentication module B.

When the PC 200 is connected to the camera 100 having the face authentication module A, it transmits a face dictionary held in it to the camera 100 without any change. In contrast, when the PC 200 is connected to the camera 100 having the face authentication module B, it extracts again face feature amount data registered in the face dictionary by using the face authentication module B, generates a face dictionary usable by the face authentication module B, and transmits the generated face dictionary to the camera 100.

That is, (1) When the PC 200 receives a face dictionary from the camera 100, it extracts again face feature amount data by using the face authentication module A from a face image (face bitmap) contained in the received face dictionary, updates the face dictionary, and stores it in the PC 200. As for a face image from which the face authentication module A has extracted face feature amount data, the PC 200 separately stores, in the PC 200, face feature amount data extracted again by the face authentication module B.

(2) When transmitting a face dictionary to the camera 100, the PC 200 extracts again face feature amount data by using the face authentication module B from a face image contained in the face dictionary, and generates a face dictionary to be transmitted. When face feature amount data extracted by the face authentication module B has already been stored in the PC 200, as in (1), the PC 200 transmits this data.

The PC 200 stores a list of the IDs of face authentication modules installed in the PC in order to confirm the face authentication modules. The PC 200 also stores information representing which of the face authentication modules in the list is used as the face authentication module of the PC 200.

<Data Structure of Face Dictionary> Next, the data structure of a face dictionary generated by the PC and camera according to the embodiment will be explained with reference to FIG. 3.

Figure 3:
FIG. 3 is a view showing the data structure of a face dictionary according to the embodiment.
Figure 3:
Figure 3:
Figure 3:
Figure 3:

Referring to FIG. 3, a region 301 is a field which records a face authentication module ID for uniquely identifying a face authentication module used to extract face feature amount data.

A region 302 is a field in which the name of a person represented by the face dictionary is registered. Assume that the user inputs a person's name when generating a face dictionary.

In a region 303, a face bitmap is registered. The face bitmap is image data obtained by cutting out, from an entire image, only a face portion used for face authentication, and resizing the face portion to a predetermined size.

In a region 304, face feature amount data representing the feature amount of a face registered as a face bitmap in the region 303 is registered. The format of face feature amount data is different depending on a face authentication module used to extract face feature amount data. The face bitmap in the region 303 and the face feature amount data 304 form an authentication face set. Authentication face sets exist by the number of registered faces. The embodiment assumes that a maximum of five faces have been registered. The face dictionary shown in FIG. 3 is a face dictionary for one person whose name has been registered. When there are face dictionary data of 10 persons, a plurality of face dictionaries as shown in FIG. 3 are held for the respective registered persons.

<Processing of Receiving Face Dictionary by PC from Camera> Processing of receiving a face dictionary by the PC 200 from the camera 100 will be described.

Figure 4A:
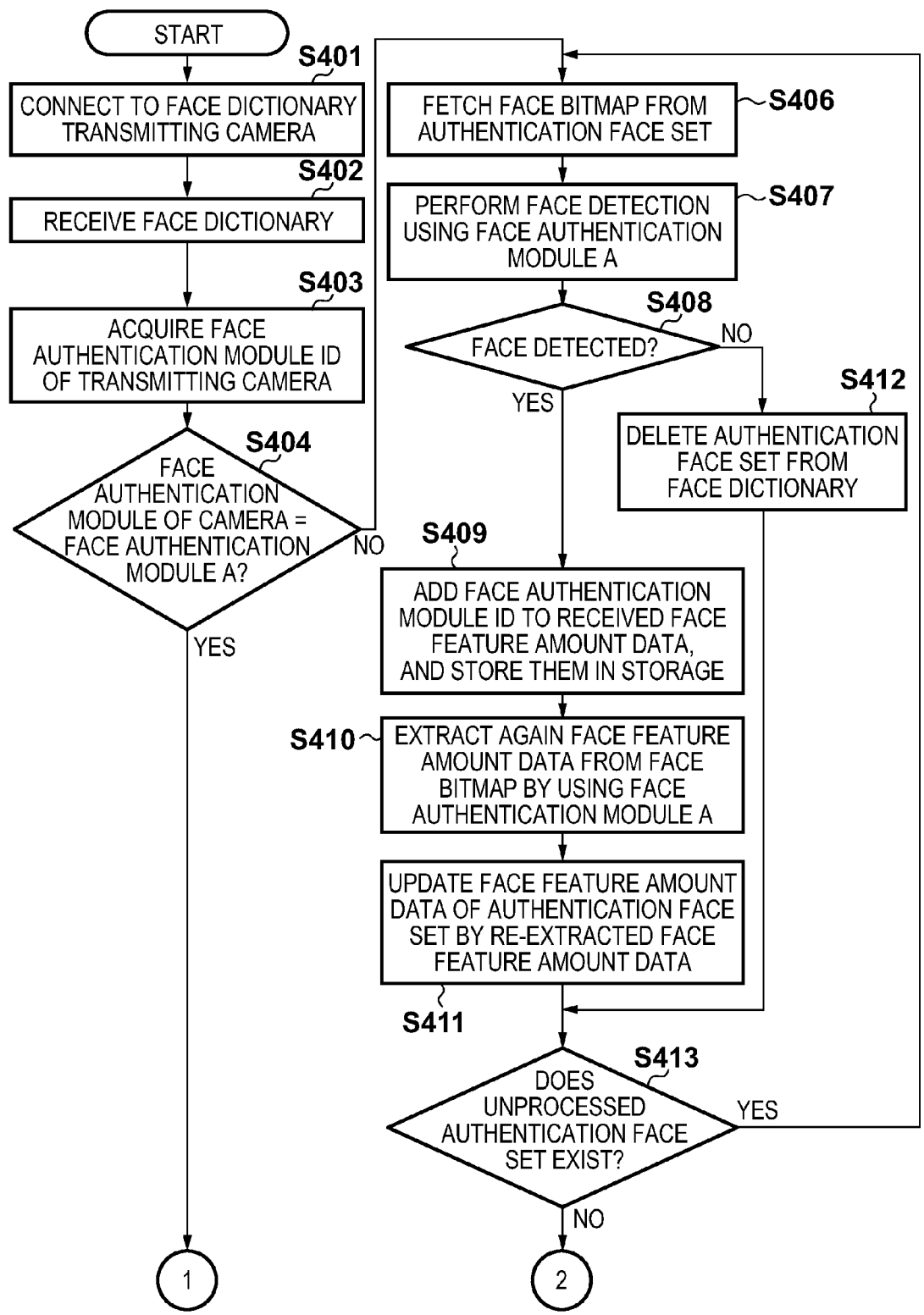
FIGS. 4A-4B are flowcharts showing processing of receiving a face dictionary by the information processing apparatus from the image capturing apparatus according to the embodiment.
Figure 4B:
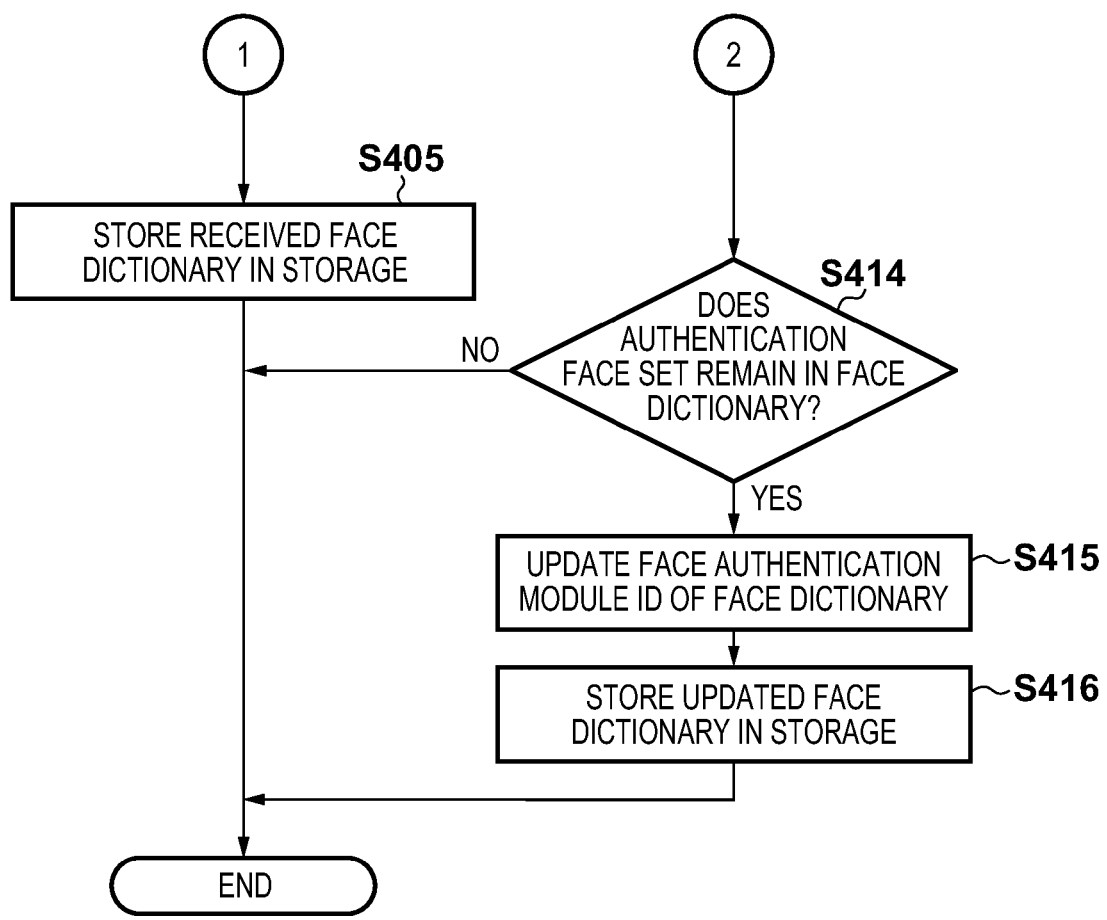

Note that the processing in FIGS. 4A-4B are implemented by executing, by the CPU 203, the image management application installed in the PC 200.

In step S401 of FIG. 4A, the camera 100 and PC 200 are connected via the communication devices 109 and 206 to establish communication between the camera 100 and the PC 200. This communication may be wired communication using a USB or the like, or wireless communication using a wireless LAN, Bluetooth®, NFC, or the like.

In step S402, the PC 200 receives a camera-side face dictionary from the camera 100.

In step S403, the PC 200 acquires the face authentication module ID of the face dictionary received from the camera 100.

In step S404, the PC 200 determines, based on the face authentication module ID acquired from the camera 100, whether the face authentication module of the camera 100 is identical to the face authentication module A of the PC 200. If the PC 200 determines in step S404 that the face authentication module of the camera 100 is identical to the face authentication module A, the process advances to step S405; if NO, the process advances to step S406.

In step S405, the PC 200 stores the face dictionary received from the camera 100 in the secondary storage 205 without any change, and then ends the process.

In step S406, the PC 200 selects one unprocessed authentication face set from the face dictionary received from the camera 100, and fetches a face bitmap contained in the authentication face set.

In step S407, the PC 200 performs face detection using the face authentication module A for the face bitmap fetched in step S406.

If the PC 200 determines in step S408 that a face has been detected in step S407, the process advances to step S409; if NO, the process advances to step S412.

In step S409, the PC 200 stores, in the secondary storage 205 separately from a face dictionary stored in the PC 200, the face feature amount data in which the face has been detected in steps S407 and S408. At this time, the face feature amount data is stored in correspondence with a face bitmap and a face authentication module which has extracted the face feature amount data, so that they can be discriminated later. For example, the face feature amount data is stored with a file name [face authentication module ID]_[person's name]_[authentication set number].

In step S410, the PC 200 extracts again face feature amount data by using the face authentication module A for the face bitmap fetched in step S406.

In step S411, the PC 200 updates the face feature amount data of the authentication face set selected in step S406 by using the face feature amount data extracted again in step S410.

In step S412, the PC 200 deletes, from the face dictionary, the authentication face set selected in step S406.

In step S413, the PC 200 determines whether an unprocessed authentication face set exists in the face dictionary stored in the secondary storage 205. If an unprocessed authentication face set still exists, the process returns to step S406 to repeat the processes. If all authentication face sets in the face dictionary have been processed, the process advances to step S414. Since the maximum number of authentication face sets contained in the face dictionary is 5 in the embodiment, the processes in step S406 and subsequent steps are repeated a maximum of five times.

In step S414, the PC 200 determines whether an authentication face set has not been deleted in step S412 and remains in the face dictionary. If an authentication face set remains, the process advances to step S415; if NO, the process ends. At this time, if a face has been detected in at least one of all face bitmaps contained in the face dictionary in step S408 (YES in step S408), an authentication face set remains in the face dictionary.

In step S415, the PC 200 updates the face authentication module ID of the face dictionary to be an ID representing the face authentication module A.

In step S416, the PC 200 stores, in the secondary storage 205 for storage, the face dictionary obtained by updating the face authentication module ID and face feature amount data.

<Processing of Transmitting Face Dictionary from PC to Camera> Processing of transmitting a face dictionary from the PC 200 to the camera 100 will be described.

Figure 5A:
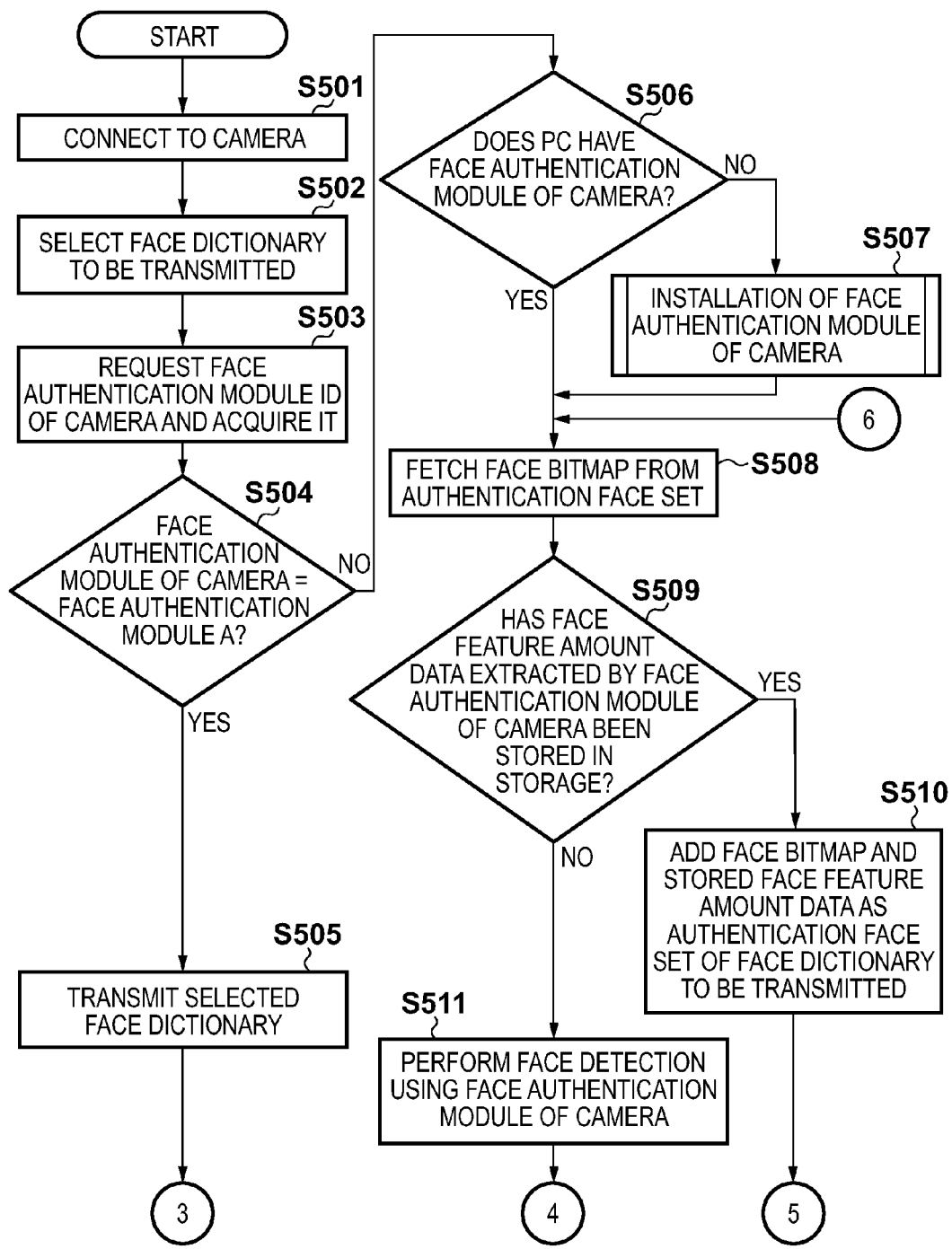
FIGS. 5A-5B are flowcharts showing processing of transmitting a face dictionary from the information processing apparatus to the image capturing apparatus according to the embodiment.
Figure 5B:
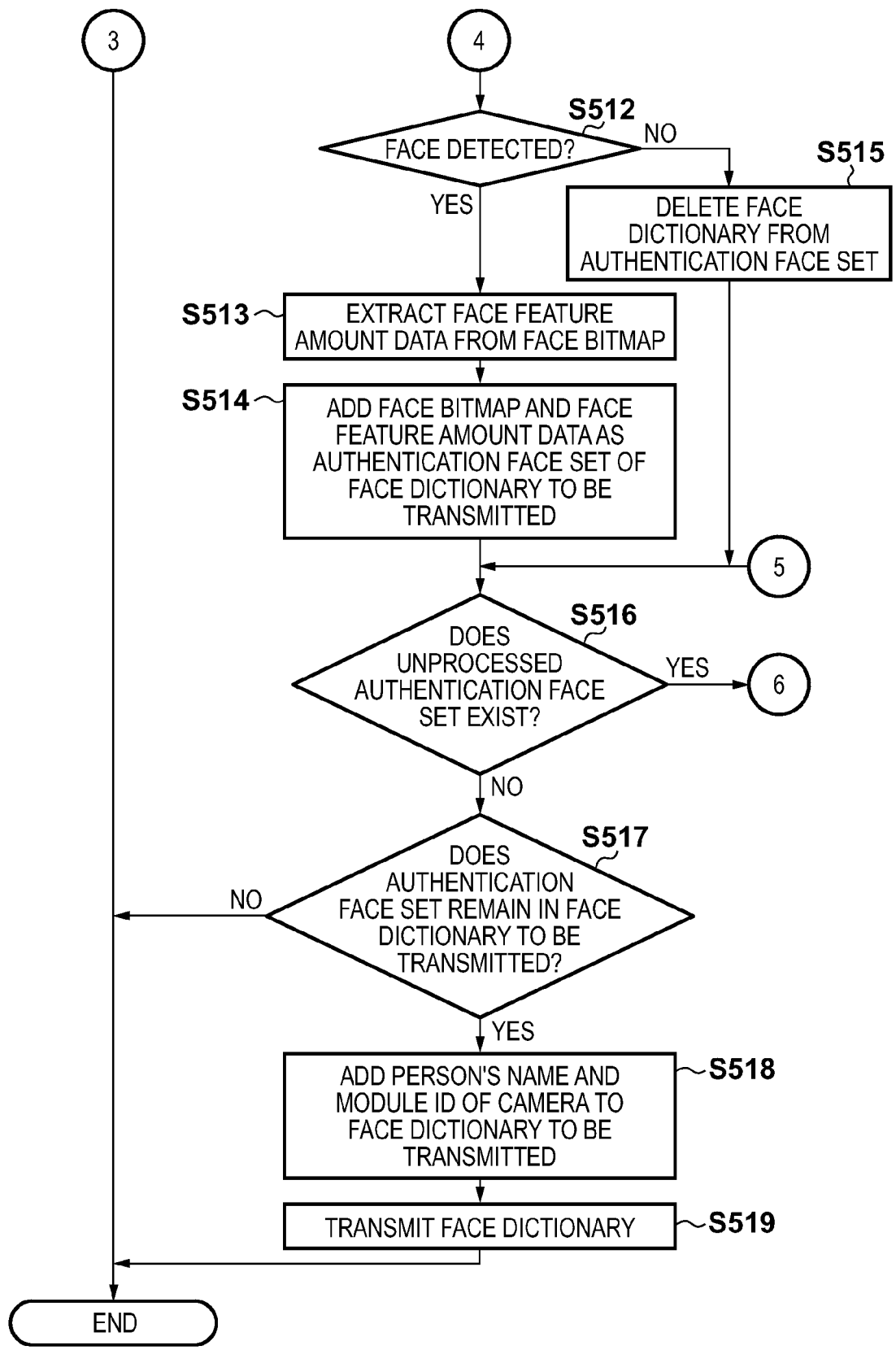

Note that the processing in FIGS. 5A-5B is implemented by executing, by the CPU 203, the image management application installed in the PC 200.

In step S501 of FIG. 5A, the camera 100 and PC 200 are connected via the communication devices 109 and 206 to establish communication between the camera 100 and the PC 200.

In step S502, the PC 200 displays, on the display unit 201, a list of person's names and face bitmaps contained in face dictionaries for all face dictionaries stored in the secondary storage 205 in order to prompt the user to select a face dictionary to be transmitted to the camera 100. When the user selects a face dictionary to be transmitted, the process advances to step S503.

In step S503, the PC 200 requests the camera 100 to transmit a face authentication module ID, and acquires it.

In step S504, the PC 200 determines, based on the face authentication module ID acquired from the camera 100, whether the face authentication module of the camera 100 is identical to the face authentication module A of the PC 200. If the PC 200 determines in step S504 that the face authentication module of the camera 100 is identical to the face authentication module A, the process advances to step S505; if NO, the process advances to step S506.

In step S505, the PC 200 reads out the face dictionary selected in step S502 from the secondary storage 205, transmits it to the camera 100, and ends the process.

In step S506, the PC 200 determines, based on the face authentication module ID acquired from the camera 100, whether the PC 200 has the face authentication module of the camera. If the PC 200 has the face authentication module of the camera, the process advances to step S508; if NO, the process advances to step S507.

In step S507, the PC 200 installs the face authentication module of the camera, details of which will be described with reference to FIG. 6.

In step S508, the PC 200 selects an unprocessed authentication face set from the face dictionary selected in step S502, and fetches a face bitmap contained in the authentication face set.

In step S509, the PC 200 determines whether face feature amount data, which corresponds to the face bitmap fetched in step S508 and has been extracted by the face authentication module of the camera, has been stored separately in the secondary storage 205. If the face feature amount data has been stored, the process advances to step S510; if NO, the process advances to step S511.

In step S510, the PC 200 fetches, from the secondary storage 205, the face feature amount data extracted by the face authentication module of the camera. Further, the PC 200 adds, to the face dictionary to be transmitted to the camera 100, the face feature amount data as an authentication face set together with the face bitmap fetched in step S508. Then, the process advances to step S515.

In step S511, the PC 200 performs face detection using the face authentication module of the camera for the face bitmap fetched in step S508.

If the PC 200 determines in step S512 that a face has been detected in step S511, the process advances to step S513; if NO, the process advances to step S515.

In step S513, the PC 200 extracts again face feature amount data by using the face authentication module of the camera for the face bitmap fetched in step S508.

In step S514, the PC 200 adds, to the face dictionary to be transmitted to the camera 100, the face feature amount data extracted in step S513 as an authentication face set together with the face bitmap.

In step S515, the PC 200 deletes, from the face dictionary, the authentication face set selected in step S508.

In step S516, the PC 200 determines whether an unprocessed authentication face set exists in the face dictionary selected in step S502. If an unprocessed authentication face set still exists, the process returns to step S508 to repeat the processes. If all authentication face sets in the face dictionary have been processed, the process advances to step S516. Since the maximum number of authentication face sets contained in the face dictionary is 5 in the embodiment, the processes in step S508 and subsequent steps are repeated a maximum of five times.

In step S517, the PC 200 determines whether an authentication face set has not been deleted in step S515 and remains in the face dictionary to be transmitted to the camera 100. If an authentication face set remains in the face dictionary, the process advances to step S517; if NO, the process ends. At this time, if face feature amount data extracted by the face authentication module of the camera in step S509 has been stored in the secondary storage 205 for at least one of all face bitmaps contained in the face dictionary stored in the secondary storage 205, or if a face has been detected in step S512, an authentication face set remains in the face dictionary to be transmitted to the camera 100.

In step S518, the PC 200 adds, to the face dictionary to be transmitted to the camera 100, the face authentication module ID representing the face authentication module of the camera, and the person's name of the face dictionary.

In step S519, the PC 200 transmits, to the camera 100, the face dictionary to which the face authentication module ID and person's name have been added in step S518 and the face feature amount data has also been added.

<Processing of Introducing Face Authentication Module of Camera by PC> Processing of introducing the face authentication module (program for face authentication) of the camera in the PC, which is executed in step S507 of FIG. 5A, will be explained with reference to FIG. 6. When introducing the face authentication module, the PC 200 is connected to a server PC which distributes the face authentication module.

Figure 6:
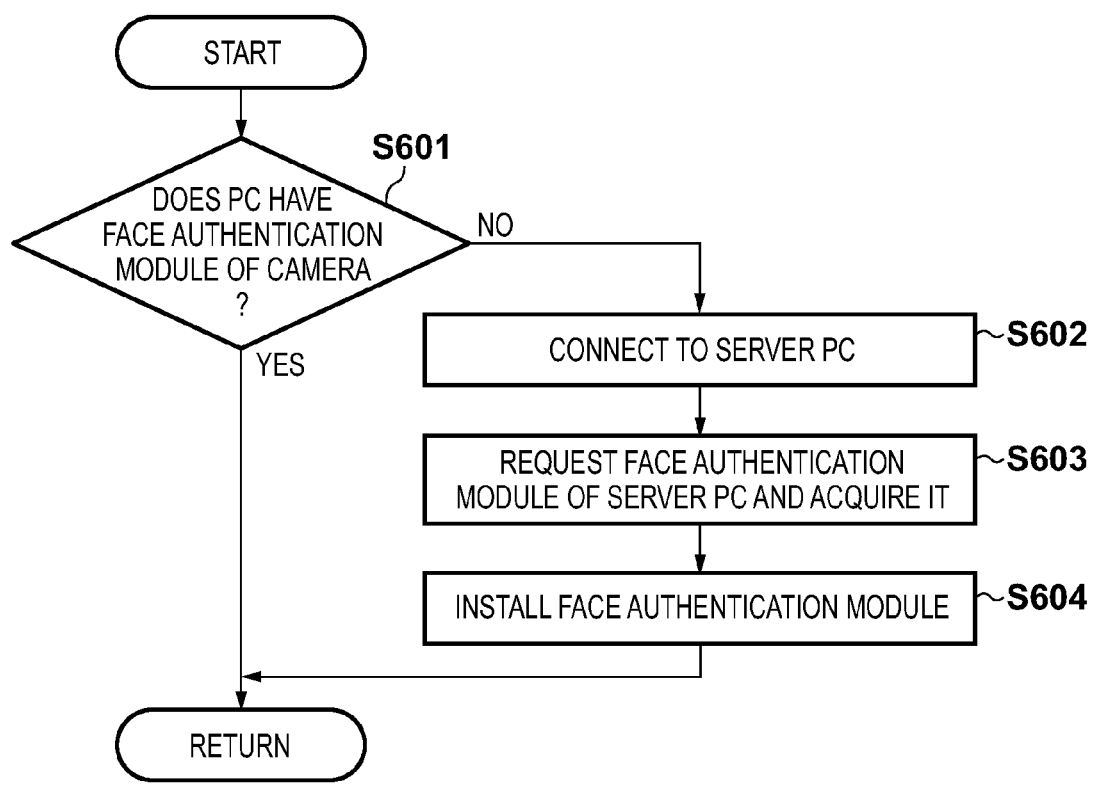
FIG. 6 is a flowchart showing processing of newly installing a face authentication module in the information processing apparatus according to the embodiment.

In step S601 of FIG. 6, by using the face authentication module ID of the camera that has been acquired from the camera 100 in step S503, the PC 200 determines whether the PC 200 has the face authentication module of the camera. If the PC 200 determines in step S601 that the PC 200 does not have the face authentication module of the camera, the process advances to step S602; if YES, the process ends.

In step S602, the PC 200 is connected via a network to the server PC which distributes a face authentication module ID.

In step S603, the PC 200 requests the server PC to transmit the face authentication module of the camera, and acquires it.

In step S604, the PC 200 installs the face authentication module of the camera acquired from the server PC so that the face authentication module of the camera can be used for face authentication. At this time, the face authentication module ID is also added to the list. The face authentication module (program for face authentication) of the camera is acquired from the server on the network in this example, but may be acquired from the camera. The user may be guided to insert a CD-ROM into the PC, and install, in the PC, a face authentication module held in the medium.

By the above-described processing, the PC 200 can acquire face feature amount data from the camera 100 having a face authentication module in which the format of face feature amount data is different, and can use it for face authentication in the PC 200. That is, only once the user generates face feature amount data for a person for whom the user wants to perform face authentication, the user can perform face authentication even in another apparatus having a face authentication module in which the format of face feature amount data is different.

If the face authentication module A has not detected a face in step S408, the PC 200 deletes the authentication face set in step S412. Thus, the PC 200 does not hold unavailable wasteful data, suppressing the amount of the storage area used.

The PC 200 can convert face feature amount data into a usable data format, and then transmit the face feature amount data to the camera 100 having a face authentication module in which the format of face feature amount data is different. Upon receiving a face dictionary from the camera 100, if the PC 200 has detected a face by using the face authentication module A (YES in step S408), it stores face feature amount data of the received face dictionary (step S409). When transmitting the face dictionary to the camera 100, if face feature amount data extracted by the face authentication module of the camera has been stored (step S409 or S509), the stored face feature amount data can be directly transmitted (step S410). Since the PC 200 is free from processing of extracting again face feature amount data from the face bitmap, the load and processing time can be reduced.

Since the face authentication module of the camera can be installed from the outside in the PC 200 (FIG. 6), a new face authentication module can be added, as needed. Compared to a case in which many face authentication modules are installed in advance, the amount of storage area used can be suppressed.

Second Embodiment

The second embodiment will be described below.

In the first embodiment, when the face authentication module A of the PC 200 detects a face, face feature amount data of a face dictionary acquired from the camera 100 is stored and added to a face dictionary to be transmitted. However, as the data amount of face dictionary acquired from the camera 100 increases, face feature amount data which are not used but are only stored in the PC 200 increase and may waste the storage area. Also, when no face has been detected from a face bitmap, an authentication face set is deleted from a face dictionary to be transmitted. As a result, the number of authentication face sets decreases, and the authentication accuracy may drop. If the face dictionary does not have a face bitmap capable of face detection, it cannot be transmitted.

A configuration which solves the above-described problems will be explained below.

In the second embodiment, the configurations of a PC and camera are the same as those in FIG. 1 according to the first embodiment. The data structure of a face dictionary is also the same as that in FIG. 3 according to the first embodiment.

<Face Dictionary Exchange Method between PC and Camera> A face dictionary exchange method between the PC and the camera according to the embodiment will be explained with reference to FIGS. 7 and 8.

Figure 7:
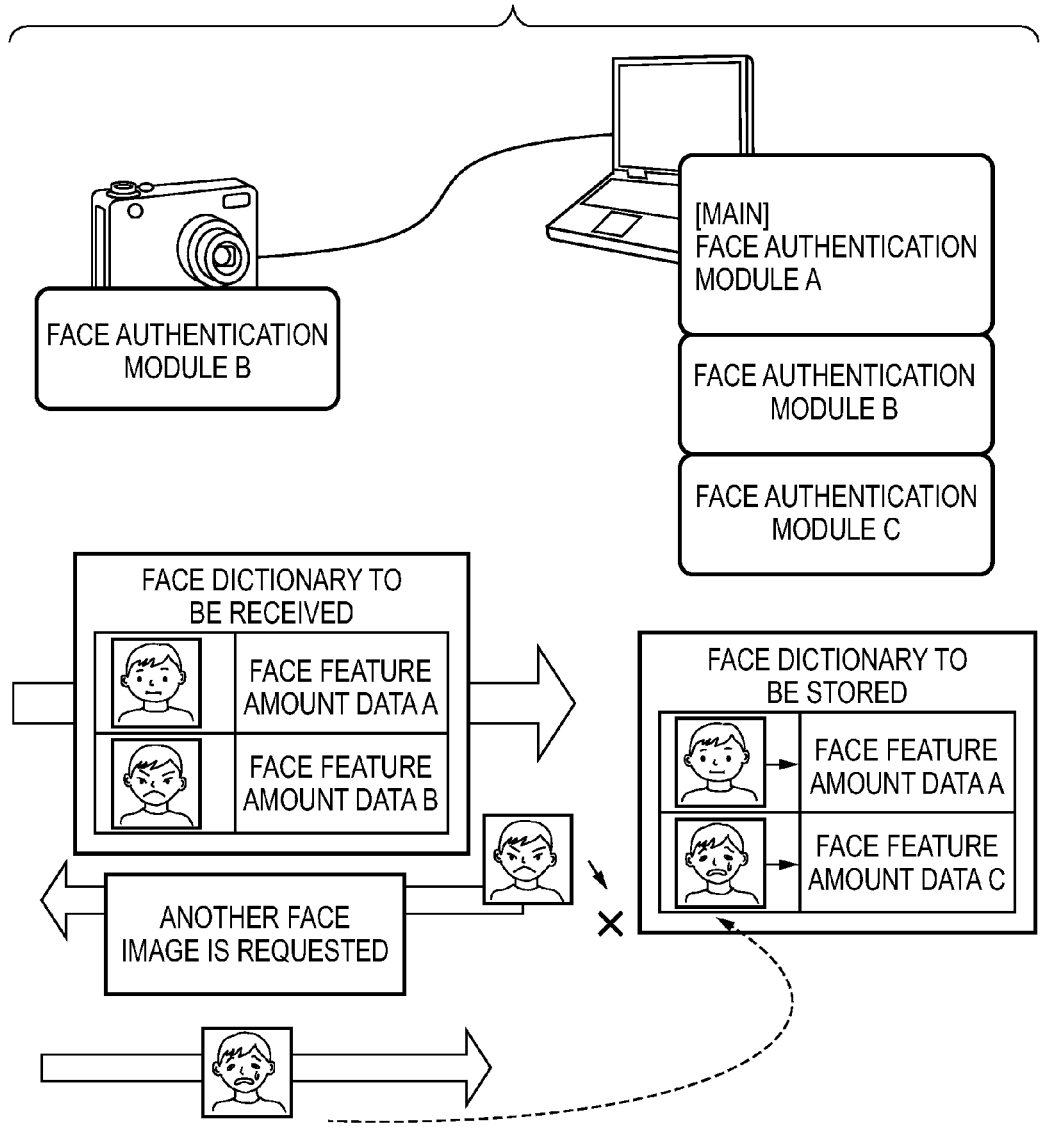
FIG. 7 is a view for explaining a face dictionary exchange method between an image capturing apparatus and an information processing apparatus according to the second embodiment.

FIG. 7 shows a case in which a PC 200 receives a face dictionary from a camera 100. FIG. 8 shows a case in which the PC 200 transmits a face dictionary to the camera 100.

The PC 200 has face authentication modules A, B, and C capable of face authentication. Assume that the format of face feature data to be extracted is different between the face authentication modules A, B, and C.

The PC 200 performs face detection using the face authentication module A, and extracts face feature amount data. The PC 200 identifies a person by comparing similarities each between face feature amount data extracted by the face authentication module A, and face feature amount data registered in a face dictionary. The face authentication modules B and C are used when the PC 200 is connected to another apparatus (for example, the camera 100) having the face authentication modules B and C.

When the PC 200 is connected to the camera 100 having the face authentication module A, it transmits a face dictionary held in it without any change. In contrast, when the PC 200 is connected to the camera 100 having the face authentication module B, as shown in FIG. 7, it extracts again face feature amount data by using the face authentication module A of the PC 200 from a face bitmap in a face dictionary received from the camera 100, updates the face dictionary, and stores the updated one. In addition, the PC 200 discards all face feature amount data contained in the face dictionary received from the camera 100. However, depending on a face bitmap, the face authentication module A of the PC 200 can neither detect a face nor obtain face feature amount data. In this case, as for a person registered in the face dictionary, the PC 200 requests the camera to transmit another face image except for the face bitmap registered in the face dictionary. Then, the PC 200 extracts face feature amount data from the acquired face image, and adds it to the face dictionary.

Figure 8:
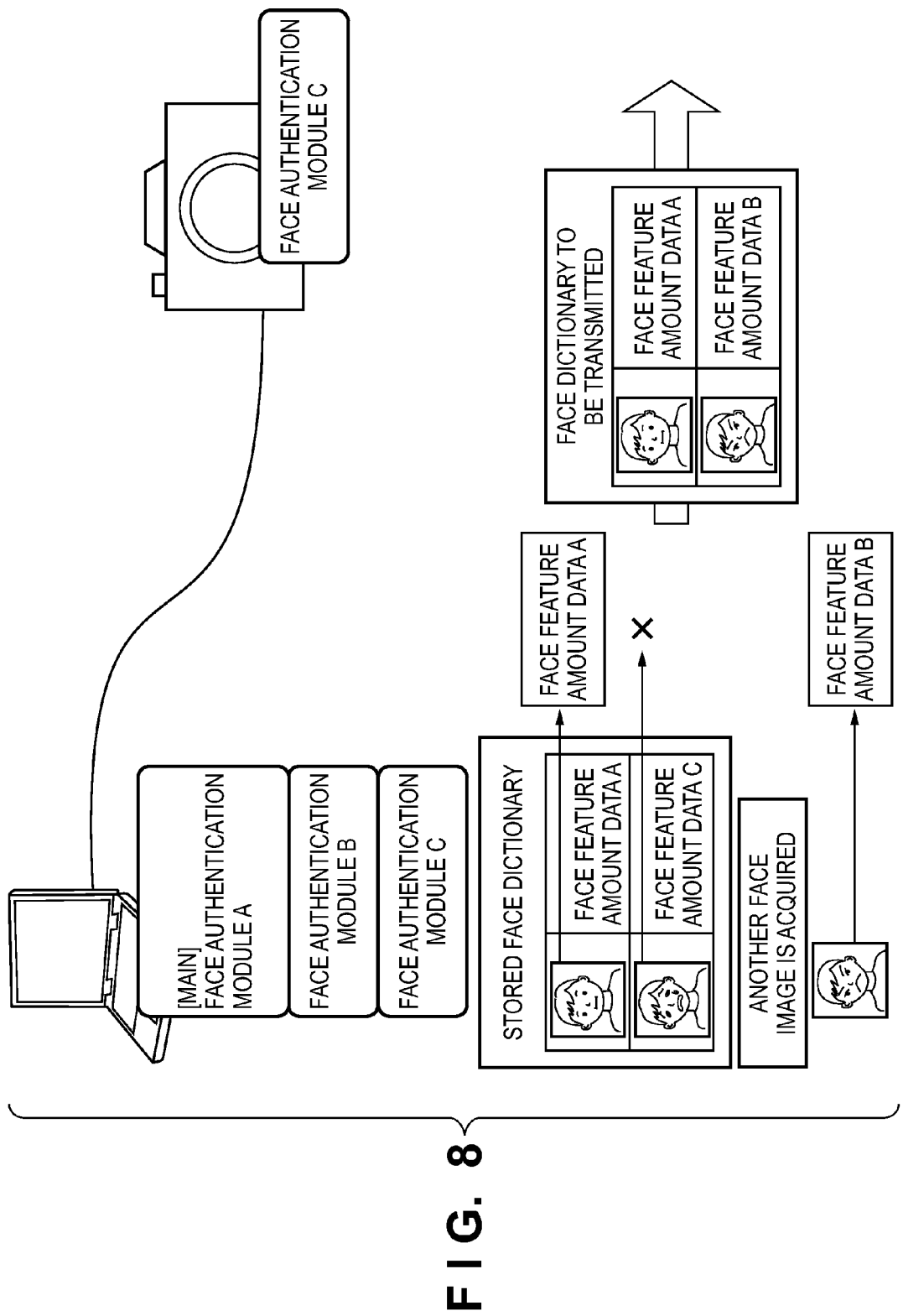
FIG. 8 is a view for explaining processing of transmitting a face dictionary from the information processing apparatus to the image capturing apparatus according to the second embodiment.

When transmitting a face dictionary to the camera 100 having the face authentication module C, as shown in FIG. 8, the PC 200 extracts again face feature amount data by using the face authentication module C from a face bitmap in a face dictionary, and generates a face dictionary to be transmitted. However, depending on a face bitmap, the face authentication module C can neither detect a face nor obtain face feature amount data. In this case, as for a person registered in the face dictionary, the PC 200 searches for another stored face image except for the face bitmap registered in the face dictionary. Then, the PC 200 extracts face feature amount data from the detected face image, and adds it to the face dictionary.

<Processing of Receiving Face Dictionary by PC from Camera> Processing of receiving a face dictionary by the PC 200 from the camera 100 will be described.

Figure 9A:
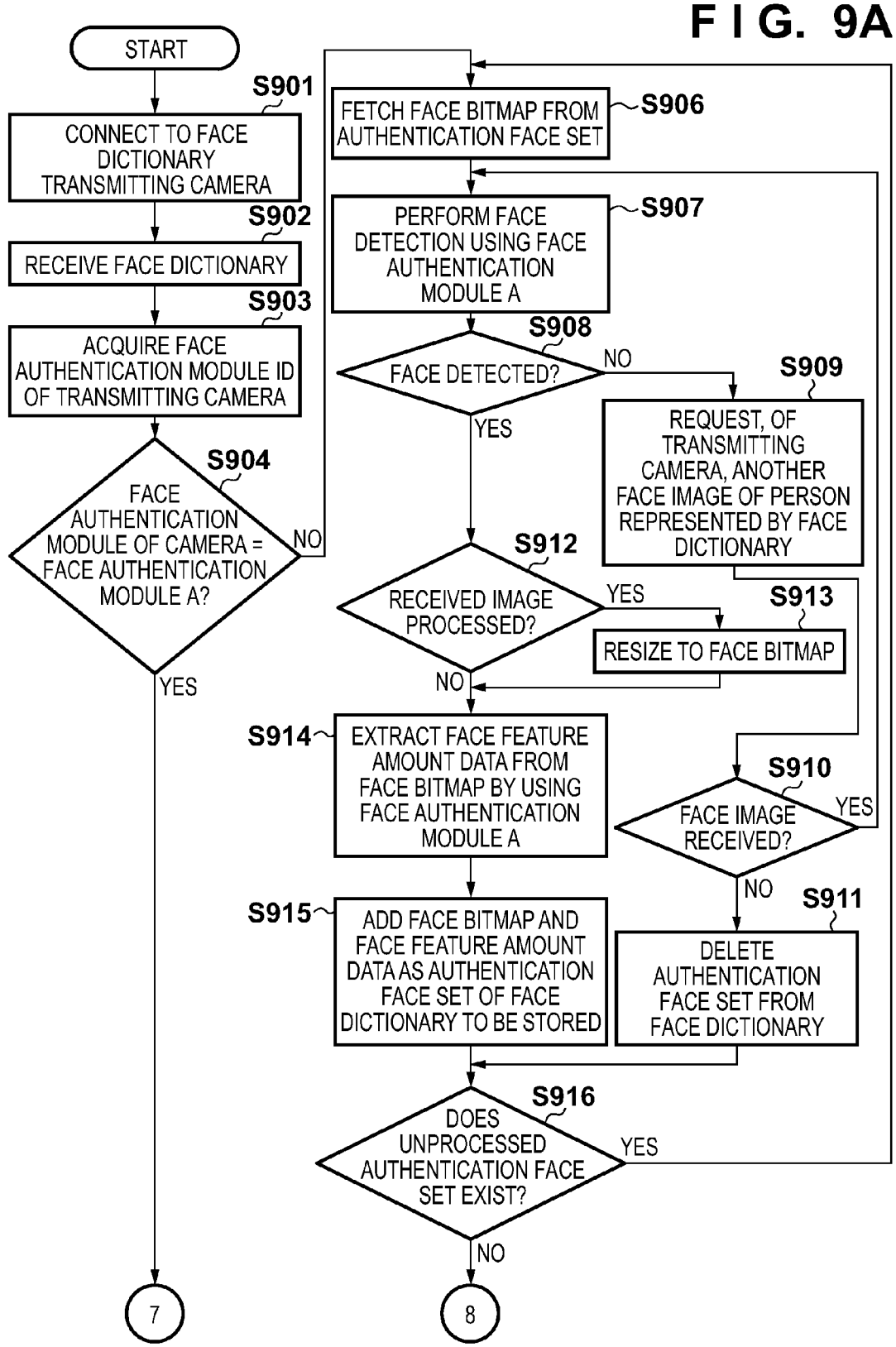
FIGS. 9A-9B are flowcharts for explaining processing of receiving a face dictionary by the information processing apparatus from the image capturing apparatus according to the second embodiment.
Figure 9B:
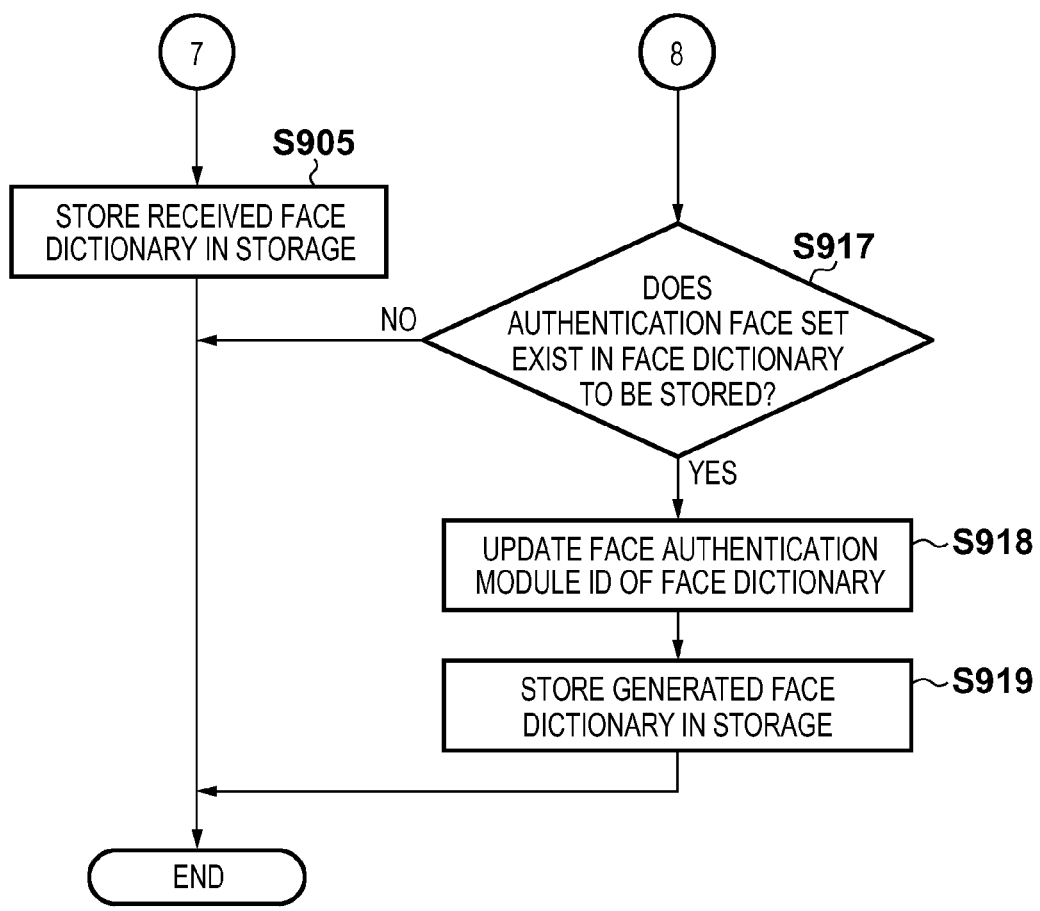

In FIGS. 9A-9B, processes in steps S901 to S908 and S916 to S919 are the same as those in step S401 to S409 and S413 to S416 of FIGS. 4A-4B, a description thereof will not be repeated, and different processes will be mainly described.

In FIGS. 9A-9B, if a face has been detected in step S907, the process advances to step S910; if NO, the process advances to step S909.

In step S909, the PC 200 requests the camera 100 to, if another face image corresponding to a person registered in the face dictionary exists in addition to a face bitmap contained in the face dictionary, transmit this face image. Note that some recent cameras and PCs prepare an area for writing a person's name in the header of a face image file, and have a function of performing face authentication upon shooting or image loading, and writing a person's name. With this function, the camera 100 searches face images held in the camera 100 by using a person's name written in a face image file, and if the face image of the requested person is detected, transmits it to the PC 200. Alternatively, the camera 100 may compare similarities with face feature amount data in the face dictionary, and searches for the face image of a person having high similarity.

In step S910, the PC 200 determines whether it has received another face image from the camera 100. If the PC 200 has received another face image, the process advances to step S907; if NO, the process advances to step S911.

In step S911, the PC 200 determines that another face image of the requested face does not exist in the camera 100, and deletes the authentication face set selected in step S906 from the face dictionary. After that, the process advances to step S915.

If the PC 200 detects a face from another face image transmitted from the camera 100 in step S912, the process advances to step S913. If the PC 200 detects a face from the face bitmap fetched in step S906, the process advances to step S914.

In step S913, the PC 200 cuts out only a face portion from the other face image transmitted from the camera 100, and resizes it to a predetermined size, thereby generating a face bitmap.

In step S914, the PC 200 extracts face feature amount data from the face bitmap by using the face authentication module A.

In step S915, the PC 200 adds the face bitmap and the extracted face feature amount data as an authentication face set to the face dictionary stored in the PC 200. Thereafter, the PC 200 performs processes in step S916 and subsequent steps.

<Processing of Transmitting Face Dictionary from PC to Camera> Processing of transmitting a face dictionary from the PC 200 to the camera 100 will be explained.

In FIGS. 10A-10B, processes in steps S1001 to S1005 and S1014 to S1019 are the same as those in step S501 to S505, S513, S514, and S516 to S519 of FIGS. 5A-5B, a description thereof will not be repeated, and different processes will be mainly described.

In FIGS. 10A-10B, if the face authentication module of the camera is not identical to the face authentication module A of the PC in step S1004, the process advances to step S1006. The PC 200 selects one unprocessed authentication face set from the face dictionary selected in step S1002, and fetches a face bitmap from the authentication face set.

In step S1007, the PC 200 performs face detection using the face authentication module of the camera in correspondence with the face bitmap fetched in step S1006.

If the PC 200 determines in step S1008 that a face has been detected in step S1007, the process advances to step S1011; if NO, the process advances to step S1009.

In step S1009, the PC 200 determines whether another unprocessed face image corresponding to a person registered in the face dictionary has been stored in addition to a face bitmap contained in the face dictionary. In this case, the PC 200 searches face images stored in a secondary storage 205 by using, as a key, a person's name written in the face image, or searches for the face image of a person having high similarity with face feature amount data in the face dictionary.

If the PC 200 detects another face image of the person registered in the face dictionary in step S1010 as a result of the search in step S1009, the process advances to step S1007; if NO, the process advances to step S1011.

In step S1011, the PC 200 determines that no other face image of the person has been stored in the secondary storage 205, and deletes the authentication face set selected in step S1006 from the face dictionary. The process then advances to step S1016.

If the PC 200 has detected a face in step S1012 from the face image detected in step S1009, the process advances to step S1013. If the PC 200 has detected a face from the face bitmap fetched in step S1006, the process advances to step S1014.

In step S1013, the PC 200 cuts out only a face portion from the face image detected in step S1009, and resizes it to a predetermined size, thereby generating a face bitmap. After that, the PC 200 performs processes in step S1014 and subsequent steps.

By the above-described processing, in addition to the effects of the first embodiment, the amount of storage area used can be suppressed because face feature amount data stored in the PC 200 is only face feature amount data extracted by the face authentication module A, and the PC 200 does not store data except for those used by the face authentication module of the PC 200.

The PC 200 can transmit face feature amount data in a usable data format to the camera 100 having a face authentication module in which the format of face feature amount data is different.

Further, if the PC 200 has not detected a face from a face bitmap when extracting again face feature amount data by using the face authentication module of the camera 100 in order to generate a face dictionary to be transmitted, the PC 200 acquires, from the camera, another face image corresponding to a person registered in the face dictionary, and adds the extracted face feature amount data to an authentication face set. This can prevent degradation of the authentication accuracy or a failure in transmitting a face dictionary.

In the embodiment, the object is not limited to a person, and the same processing as the above-described one can be performed even for an animal other than a person.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blue-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-037694, filed Feb. 27, 2013 which is hereby incorporated by reference herein in its entirety.

What is claimed is:

1. An information processing apparatus comprising:
   a communication interface which communicates with an external apparatus having a face authentication function;
   a memory which stores image data held in the external apparatus and a face feature amount used by the external apparatus for the face authentication function received from the external apparatus by the communication interface; and
   at least one processor which controls, in accordance with a result of comparing a type of a face authentication function of the information processing apparatus with the type of the face authentication function of the external apparatus, using the face feature amount received from the external apparatus for the face authentication function of the information processing apparatus, or to re-generating, from the image data received from external apparatus, a face feature amount corresponding to the type of the face authentication function of the information processing apparatus.

2. The apparatus according to claim 1, wherein when the type of the face authentication function of the information processing apparatus and the type of the face authentication function of the external apparatus are identical, the at least one processor uses the received face feature amount, and when the type of the face authentication function of the information processing apparatus and the type of the face authentication function of the external apparatus are different, re-generates a face feature amount corresponding to the type of the face authentication function of the information processing apparatus from the received image data.

3. The apparatus according to claim 1, wherein the at least one processor is further configured to request another image of the external apparatus when no face has been acquired from the received image.

4. The apparatus according to claim 1, wherein when the type of the face authentication function of the information processing apparatus and the type of the face authentication function of the external apparatus are different and the information processing apparatus transmits the face feature amount to the external apparatus, the at least one processor re-generates a face feature amount held in the information processing apparatus into a face feature amount for the external apparatus, and transmits the face feature amount.

5. The apparatus according to claim 1, wherein when the type of the face authentication function of the information processing apparatus and the type of the face authentication function of the external apparatus are different and the information processing apparatus does not have the face authentication function of the type held in the external apparatus, the at least one processor acquires, from a server, data corresponding to the face authentication function of the type held in the external apparatus, and installs, in the information processing apparatus, the face authentication function of the type held in the external apparatus.

6. The apparatus according to claim 1, wherein when the type of the face authentication function of the information processing apparatus and the type of the face authentication function of the external apparatus are identical and the information processing apparatus transmits the face feature amount to the external apparatus, the at least one processor transmits a face feature amount held in the information processing apparatus without any change.

7. A control method of an information processing apparatus which has a memory, at least one processor and a communication interface which communicates with an external apparatus having a face authentication function, the method comprising:
   receiving a type of the face authentication function of the external apparatus from the external apparatus via the communication interface;
   storing image data held in the external apparatus and a face feature amount used for the face authentication function in the memory; and
   controlling by the at least one processor, in accordance with a result of comparing a type of a face authentication function of the information processing apparatus with the type of the face authentication function of the external apparatus, using the face feature amount received from the external apparatus for the face authentication function of the information processing apparatus, or to re-generating, from the image data received from the external apparatus, a face feature amount corresponding to the type of the face authentication function of the information processing apparatus.

8. A non-transitory computer-readable storage medium storing a program for causing a computer to execute a control method of an information processing apparatus which has a memory, at least one processor and a communication interface which communicates with an external apparatus having a face authentication function, the method comprising:
   receiving a type of the face authentication function of the external apparatus from the external apparatus via the communication interface;
   storing image data held in the external apparatus and a face feature amount used for the face authentication function in the memory; and
   controlling by the at least one processor, in accordance with a result of comparing a type of a face authentication function of the information processing apparatus with the type of the face authentication function of the external apparatus, using the face feature amount received from the external apparatus for the face authentication function of the information processing apparatus, or to re-generating, from the image data received from the external apparatus, a face feature amount corresponding to the type of the face authentication function of the information processing apparatus.

9. The storage medium according to claim 8, wherein when the type of the face authentication function of the information processing apparatus and the type of the face authentication function of the external apparatus are identical, controlling the at least one processor to use the received face feature amount, and when the type of the face authentication function of the information processing apparatus and the type of the face authentication function of the external apparatus are different, controlling the at least one processor to re-generate from the received image data a face feature amount corresponding to the type of the face authentication function of the information processing apparatus.

10. The storage medium according to claim 8, wherein the control method further comprises requesting another image of the external apparatus when no face has been acquired from the received image.

11. The storage medium according to claim 8, wherein when the type of the face authentication function of the information processing apparatus and the type of the face authentication function of the external apparatus are different and the information processing apparatus transmits the face feature amount to the external apparatus, controlling the at least one processor to re-generate a face feature amount held in the information processing apparatus into a face feature amount for the external apparatus, and to transmit the re-generated face feature amount to the external apparatus.

12. The storage medium according to claim 8, wherein when the type of the face authentication function of the information processing apparatus and the type of the face authentication function of the external apparatus are different and the information processing apparatus does not have the face authentication function of the type held in the external apparatus, controlling the at least one processor to acquire from a server data corresponding to the face authentication function of the type held in the external apparatus, and to install the acquired face authentication function of the type held in the external apparatus in the information processing apparatus.

13. The storage medium according to claim 8, wherein when the type of the face authentication function of the information processing apparatus and the type of the face authentication function of the external apparatus are identical and the information processing apparatus transmits the face feature amount to the external apparatus, controlling the at least one processor to transmit a face feature amount held in the information processing apparatus without any change.

* * * * *